United States Patent [19]

Mulawski

[11] Patent Number: 4,513,874

[45] **Date of Patent: * Apr. 30, 1985**

[54] PRESSURE RELIEF DEVICE FOR INTERNALLY PRESSURIZED FLUID CONTAINER

[75] Inventor: Walter J. Mulawski, Chelmsford, Mass.

[73] Assignee: Sexton Can Company, Inc., Everett, Mass.

[ * ] Notice: The portion of the term of this patent subsequent to Feb. 28, 2001 has been disclaimed.

[21] Appl. No.: 573,869

[22] Filed: Jan. 25, 1984

Related U.S. Application Data

[63] Continuation-in-part of Ser. No. 327,200, Dec. 3, 1981, Pat. No. 4,433,791, which is a continuation of Ser. No. 169,404, Jul. 16, 1980, abandoned.

[51] Int. Cl.[3] .......... B65D 51/16; B65D 83/14; F16K 17/14

[52] U.S. Cl. .......... 220/89 A; 137/68 R; 222/397

[58] Field of Search .......... 220/89 A, 207; 137/68 R; 222/397

[56] References Cited

U.S. PATENT DOCUMENTS

| | | | |
|---|---|---|---|
| 2,795,350 | 6/1957 | Lapin | 220/89 A X |
| 3,292,826 | 12/1966 | Abplanalp | 220/89 A |
| 3,484,817 | 12/1969 | Wood | 220/89 A |
| 3,724,727 | 4/1973 | Zundel | 222/397 |
| 3,786,967 | 1/1974 | Giocomo et al. | 222/397 |
| 3,826,412 | 7/1974 | Kneusel | 222/397 |
| 3,831,822 | 8/1974 | Zundel | 222/397 |
| 3,902,626 | 9/1975 | Jordon et al. | 220/268 |
| 3,979,009 | 9/1976 | Walker | 220/70 X |
| 3,998,174 | 12/1976 | Sannders | 220/70 X |
| 4,003,505 | 1/1977 | Hardt | 222/397 |
| 4,433,791 | 2/1984 | Mulawski | 222/397 |

OTHER PUBLICATIONS

Steel Plates and Their Fabrication, Lukens Steel Co.; Coatesville, Pa., 1947, pp. 111-115.

Defects and Failures of Metals, Polushkin; Elsevier Publishing Co., (Amsterdam, London, N.Y., Princeton), 1956, pp. 302, 303.

Strength and Resistance of Metals, Lessells; John Wiley and Sons, Inc., N.Y., 1954, pp. 7 and 8.

Theory and Design of Modern Pressure Vessels, 2nd Ed., Harvey; Van Nostrand Reinhold Co. (N.Y., Cinn., Toronto, London, Melbourne), 1974, pp. 189-197.

*Primary Examiner*—Allan N. Shoap
*Attorney, Agent, or Firm*—Maurice E. Gauthier

[57] ABSTRACT

A pressure relief device for a metal container having a generally cylindrical side wall and being of the type adapted to contain fluids under pressure. The device includes a concave closure element circumferentially joined to one end of the container side wall. The closure element is deep drawn of tempered steel, with a generally convex tab member integrally formed in a central area thereof. The tab member is partially circumscribed by a weakened line of reduced material thickness, and the closure element has a structural integrity which reacts to an overpressurization of the fluid in the container by undergoing a partial eversion which initiates a fracture along the weakened line accompanied by an outward deflection of the tab member, thereby permitting the overpressurized fluid contents to escape through the fracture.

12 Claims, 18 Drawing Figures

PRESSURE RELIEF DEVICE FOR INTERNALLY PRESSURIZED FLUID CONTAINER

RELATED APPLICATIONS

This is a continuation-in-part of copending application Ser. No. 327,200 filed Dec. 3, 1981, now U.S. Pat. No. 4,433,791, issued Feb. 28, 1984 which in turn is a continuation of application Ser. No. 169,404 filed July 16, 1980, now abandoned.

BACKGROUND OF THE INVENTION

This invention relates to pressure release devices for internally pressurized fluid containers.

Pressurized fluid containers are in widespread use for packaging and dispensing a variety of fluid products, including liquids, gases and combinations thereof. Under normal operating conditions, such containers perform entirely satisfactorily. However, in the event that the contents of such containers become overpressurized, either because of improper use, exposure to heat or for any other reason, then a violent rupture may occur. For the last 30 years, those skilled in the art have been attempting to deal with this problem by incorporating various types of pressure release devices into the container structures. Examples of some of these previously developed pressure release devices are disclosed in U.S. Pat. Nos. 2,795,350 (Lapin); 2,951,614 (Greene); 3,074,602 (Shillady, et al); 3,292,826 (Abplanalp); 3,515,308 (Hayes et al); 3,622,051 (Benson); 3,724,727 (Zundel); 3,759,414 (Beard); 3,815,534 (Kneusel); 3,826,412 (Kneusel); 3,831,822 (Zundel); 4,003,505 (Hardt); 4,158,422 (Witten et al); and 4,347,942 (Jernberg et al). However, for a variety of reasons including unreliability, high cost, difficulty of maintaining critical tolerances during manufacture, etc., none of these devices has proved to be acceptable.

The objective of the present invention is to provide an improved pressure release device which operates reliably within a predictable range of pressures, which is simple in design, capable of being mass produced, and which can be integrally incorporated into the container structure at a reasonable cost to the consumer.

SUMMARY OF THE INVENTION

The pressure release device of the present invention includes a concave closure element circumferentially joined to one end of a tubular container side wall. The closure element is deep drawn of tempered steel, with a circular central area spaced from an annular outer area by an annular intermediate area traversed by radially extending Lueders' Lines. A convex tab member is provided in the central area. The tab member is partially circumscribed by a single weakened line of reduced material thickness. The weakened line lies on a circle concentric with the focal point of the Lueders' Lines and at the center of the closure element, with the ends of the weakened line being separated by a connecting area of substantially undisturbed material thickness and strength.

In one embodiment of the invention to be described hereinafter in greater detail, the closure element has a structural integrity which reacts to an increase in container pressure above a prescribed level by undergoing least a partial eversion which begins at the annular outer area. This eversion progresses rapidly in wave form in a generally radial direction across the annular intermediate area and into the circular central area to produce a stress concentration which causes a fracture along the weakened line partially circumscribing the tab member. As the overpressurized contents of the container are exhausted through this fracture, the tab member is deflected outwardly. The connecting area between the ends of the weakened line acts as a hinge which maintains a connected relationship between the outwardly deflected tab and the remainder of the closure element.

In another embodiment of the invention also to be described hereinafter in greater detail, the central area of the concave closure element is again provided with a convex tab member partially circumscribed by a weakened line. However, the outer, intermediate and central areas of the closure element respectively have progressively diminished resistance to eversion. With this arrangement, eversion produced by overpressurization of the container contents occurs initially at the central area and thereafter progresses radially outwardly towards the annular outer area. This is preferably achieved by forming the outer, intermediate and central areas respectively with progressively increased radii. By allowing eversion to occur initially at the central area, the resulting stress concentrations which produce a rupture of the weakened line operate more rapidly and predictably. Preferably, the annular intermediate area has a flattened depression located radially outwardly from the weakened line which resists radial outward progression of the eversion thereacross. This increases the concentration of mechanical stresses at the weakened line, thereby further assisting in producing the rupture required to vent the overpressurized container contents.

BRIEF DESCRIPTION OF THE DRAWINGS

Preferred embodiments of the invention will now be described with reference to the accompanying drawings wherein.

DETAILED DESCRIPTION OF THE INVENTION

Figure 1:
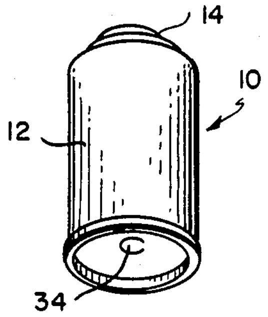
FIG. 1 is a bottom perspective view of a container including a closure element in accordance with a first embodiment of the present invention.
Figure 4:
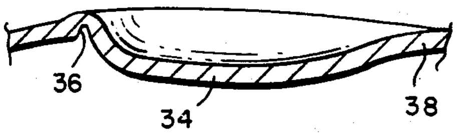
FIG. 4 is a sectional view on an enlarged scale taken along line 4—4 of FIG. 2.
Figure 2:
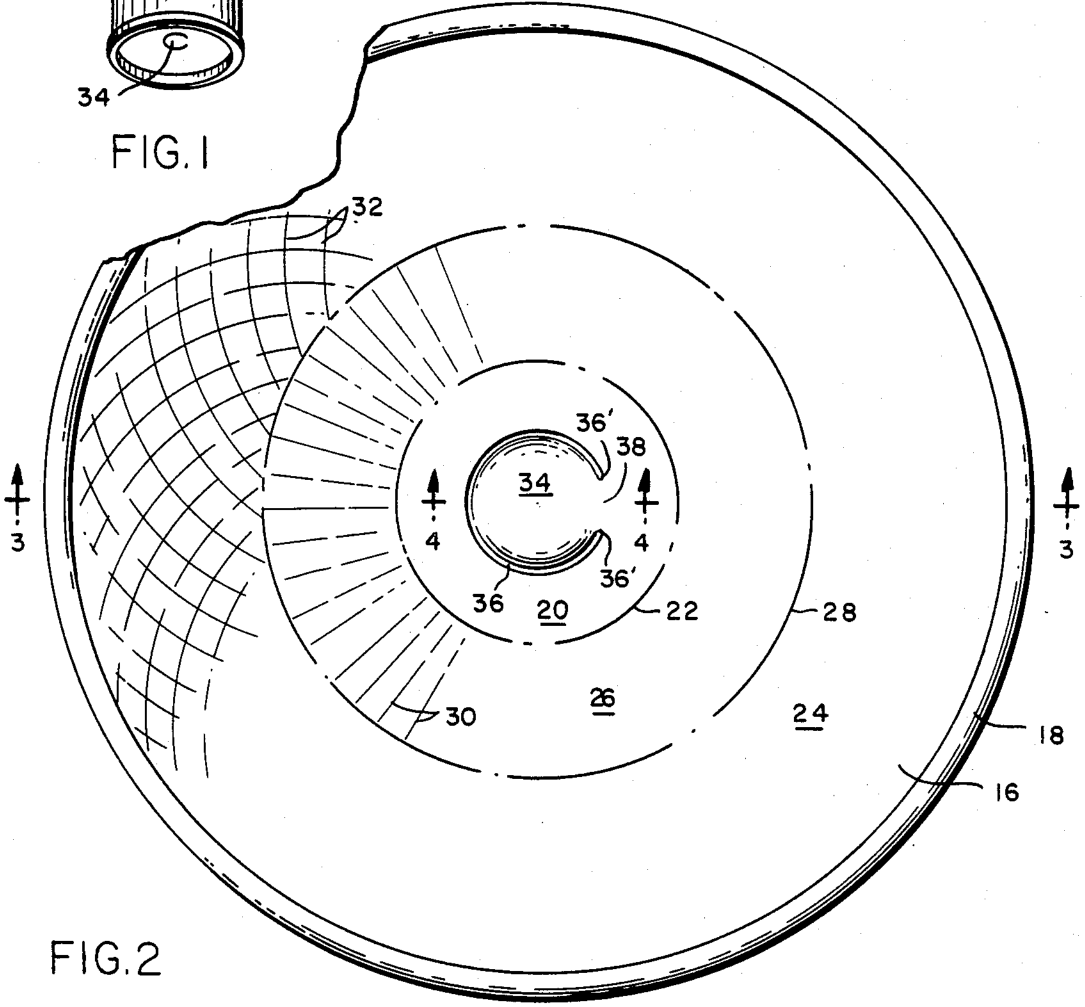
FIG. 2 is a bottom plan view on a greatly enlarged scale of the container shown in FIG. 1.
Figure 3:
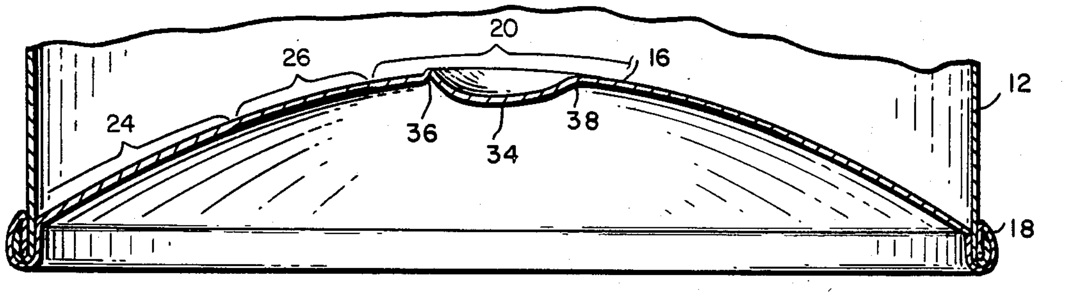
FIG. 3 is a sectional view taken along line 3—3 of FIG. 2.

Referring initially to FIGS. 1-4, a container of the type conventionally employed to package and dispense pressurized fluids is shown at 10. The container has a tubular metal side wall 12 which is stepped at one end as at 14 to accommodate a conventional cap or the like (not shown). A concave closure element 16 is applied to the opposite end of the side wall 12. The closure element may be circumferentially joined to the side wall by any conventional means, preferably by the double seam connection indicated at 18 in the drawings.

The closure element 16 is deep drawn of tempered steel with a circular central area 20. The circular central area 20 is spaced from an annular outer area 24 by an annular intermediate area 26, the latter area being illustratively delineated in the drawings by dot-dash reference lines 22 and 28.

The annular intermediate area 26 is travesed by radially extending Lueders' Lines indicated typically at 30. The Lueders' Lines are visible as surface markings, or surface roughening, caused by inhomogeneous yielding during the deep drawing operation. The annular outer area of the closure element 16 is further characterized by a pattern of biaxial criss-crossed strain lines indicated typically at 32. These lines are also believed to be the result of inhomogeneous yielding during the deep drawing operation.

From the standpoint of material thickness, the annular intermedite area 26 is thinner than both the circular central area 20 and the annular outer area 24. The annular outer area 24 is thicker than the circular central area 20. These thickness relationships are again the result of the deep drawing operation.

A tab member 34 is located in the circular central area 20. The tab member is partially circumscribed by a single weakened line 36 of reduced material thickness. The line 36 lies on a circle concentric with the focal point of the Lueders' Lines and the center of the closure element 16. The ends 36' of the weakened line 36 are separated by a connecting area 38 of substantially undisturbed material thickness and strength. The tab member 34 is convex, with the weakened line 36 consisting of a groove in the outer surface of the closure element.

Figure 5:
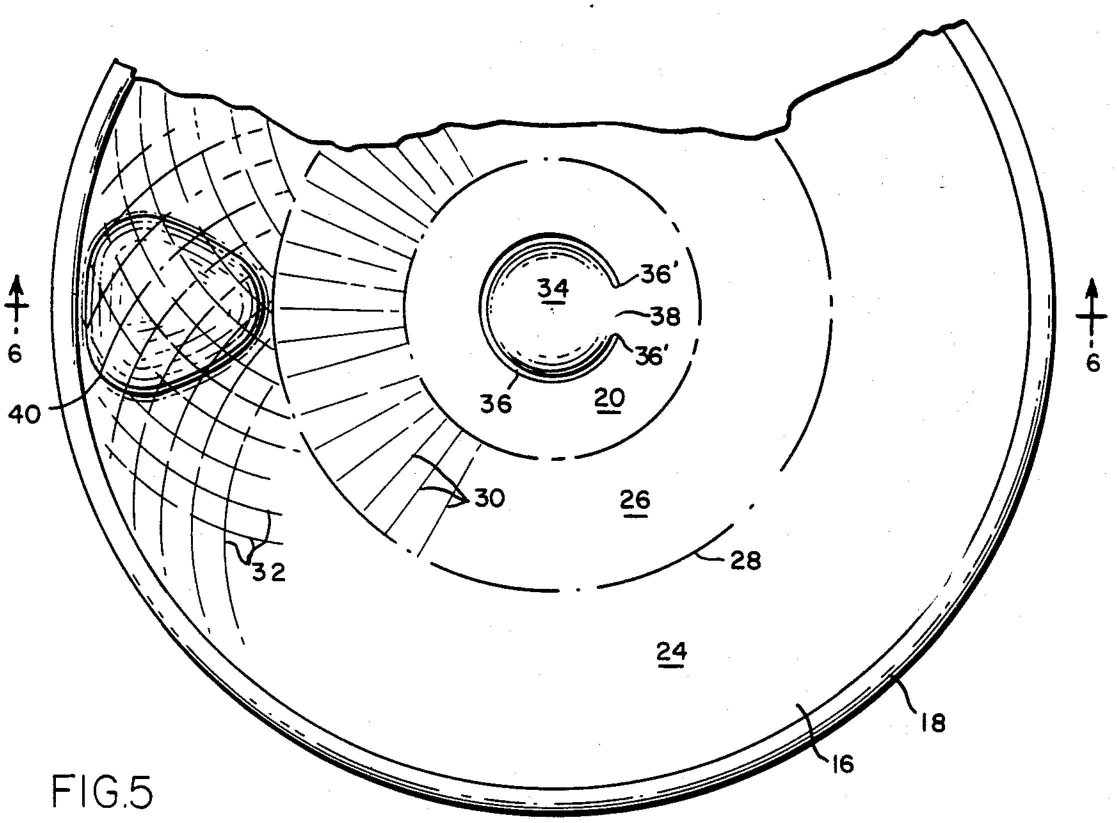
FIGS. 5 and 6 are views similar to FIGS. 2 and 3 showing the first stages of partial eversion of the first embodiment as a result of the container contents being overpressuzed.
Figure 6:
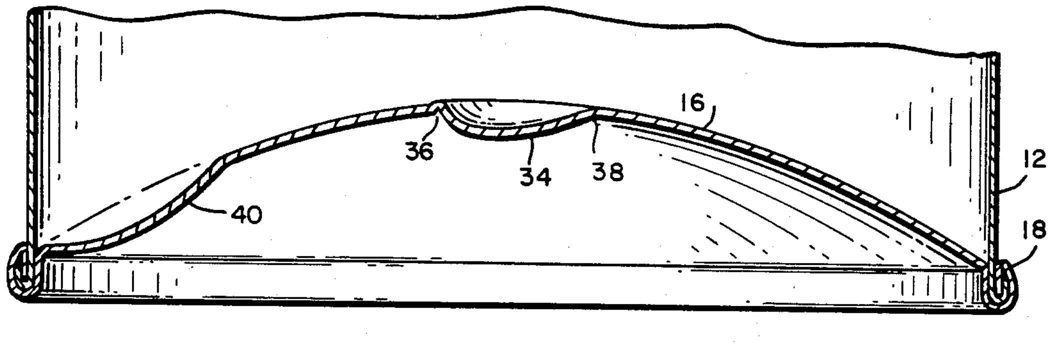
Figure 7:
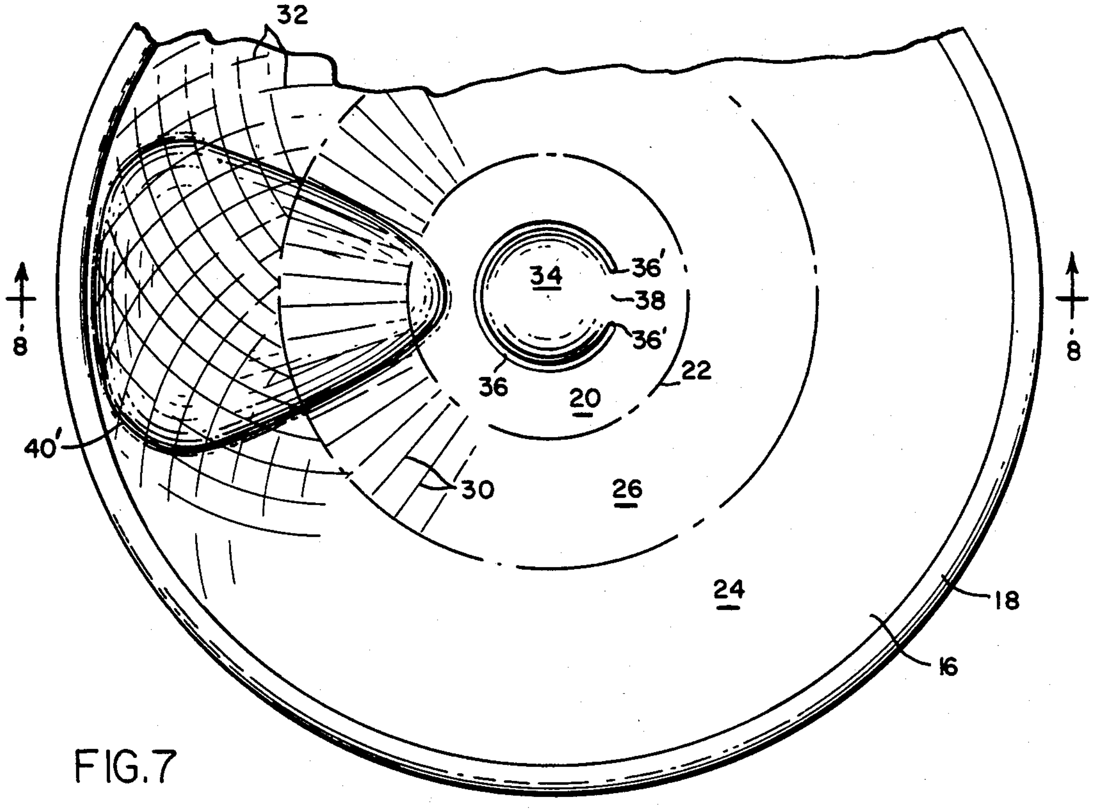
FIGS. 7 and 8 are views similar to FIGS. 2 and 3 showing a further development of the partial eversion of the first embodiment.
Figure 8:
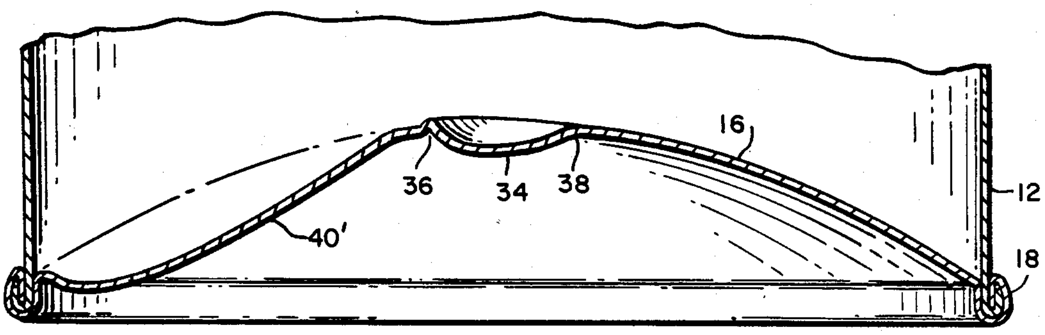
Figure 9:
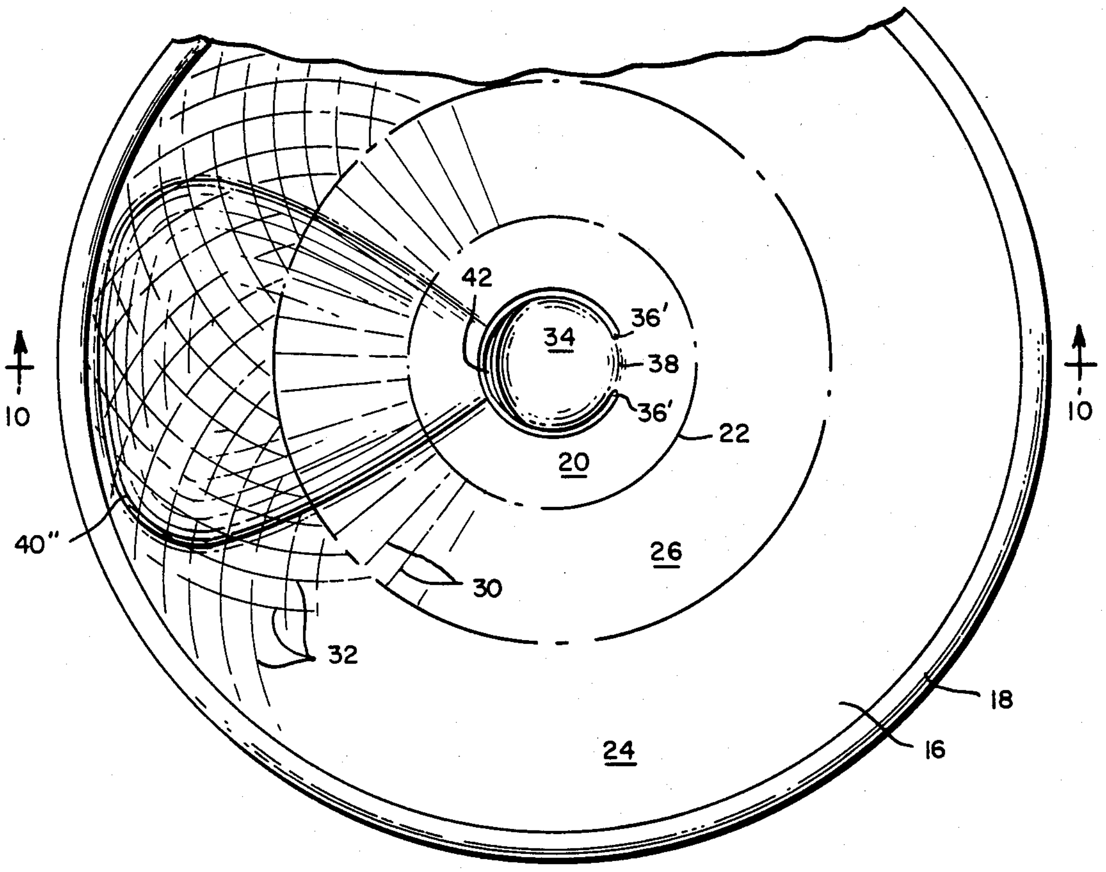
FIGS. 9 and 10 are again views similar to FIGS. 2 and 3 showing fracture of the weakened line surrounding the pressure release tab of the first embodiment, with accompanying venting of the over-pressurized container contents.
Figure 10:
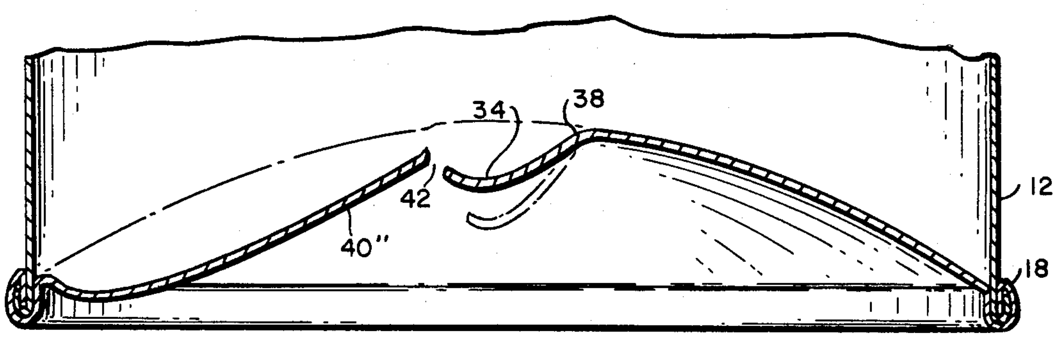

The closure element 16 has a structural integrity which reacts to an increase in fluid pressure above a prescribed level by initially undergoing at least a partial eversion at the annular outer area 24. An example of one such partial eversion is illustrated at 40 in FIGS. 5 and 6. Based on available experimental data, the initial eversion 40 appears to commence at random locations with respect to the outer rim of the closure element, with a rapid snap-through of a local area from the as-drawn concave configuration to the somewhat convex shape shown in the drawings. As illustrated in FIGS. 7 and 8, this area of initial eversion then progresses radially in a wave form as shown at 40' across the annular intermediate area 26 into the circular central area 20. The radially arranged Lueders+ Lines appear to concentrate the inwardly radially spreading partial eversion 40'' thereby setting up a high concentration of bending stresses along the weakened line 36 bordering the tab member 34. This high stress concentration is more than sufficient to initiate a local fracture of the closure element 16 along the weakened line 36 as indicated at 42 in FIGS. 9 and 10. The over-pressurized contents of the can are then vented through the fracture 42. As this occurs, the fracture will progress around the line 36 allowing the venting rate to increase as necessary. The connecting area 38 serves as a hinge about which the tab member 34 is deflected outwardly under the influence of the escaping pressurized contents. Connecting area 38 has sufficient strength to withstand fracture, thereby maintaining the tab member 34 connected to the remainder of the closure element 16 as venting takes place.

Figure 11:
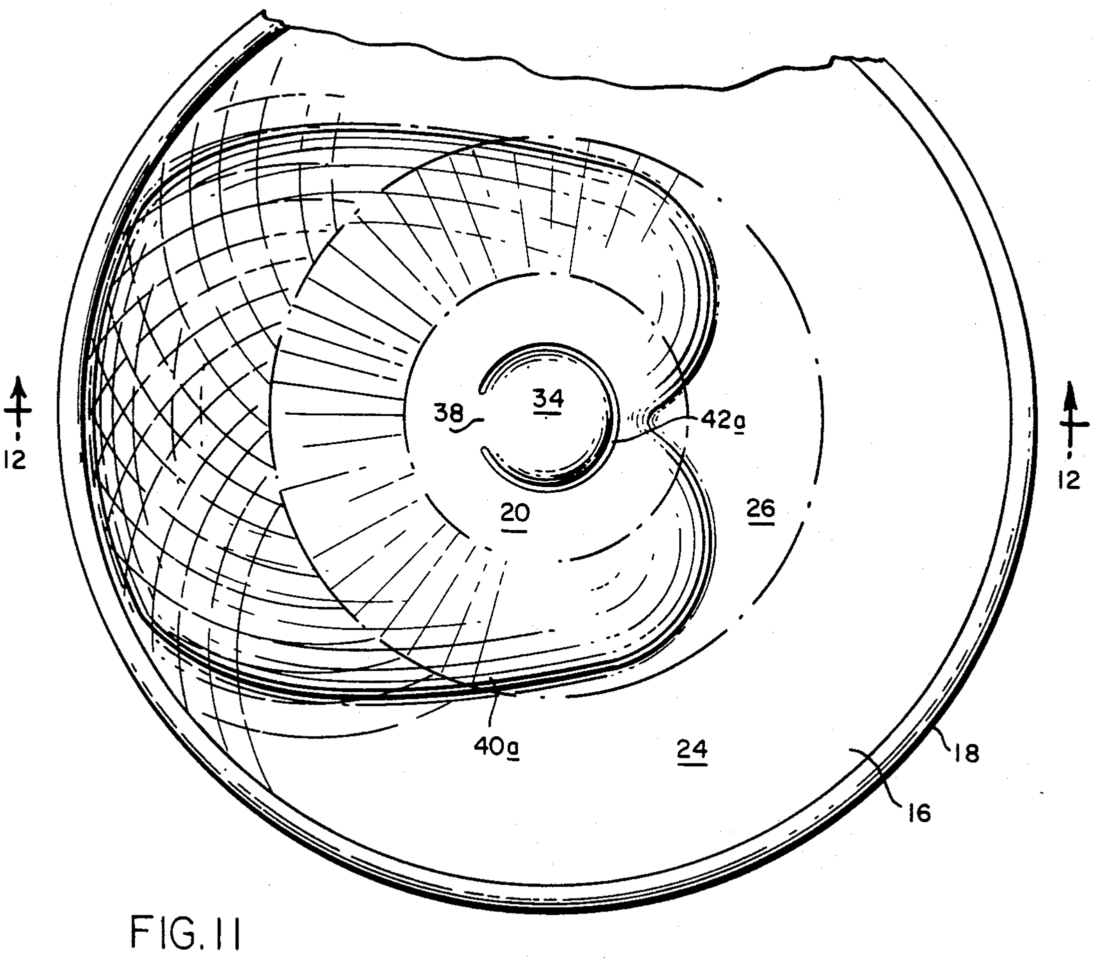
FIGS. 11 and 12 are views similar to FIGS. 9 and 10 showing the resulting fracture of the weakened line of the first embodiment when the partial eversion initially occurs between the connecting area of the tab member and the container rim.
Figure 12:
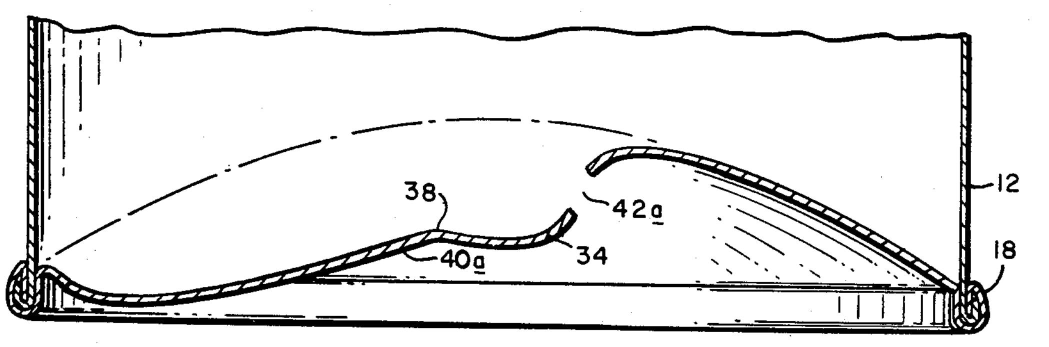

As previously indicated, initial localized eversion of the annular outer area occurs in a random manner. Under certain circumstances where this initial eversion occurs between the tab connecting area 38 and the outer rim of the closure element, the eversion will progress inwardly radially as indicated at 40*a* in FIGS. 11 and 12, eventually enveloping the tab member 34 before localized fracture occurs as at 42*a*.

A number of significant advantages result from the above-described combination of features. For example, by locating the tab member 34 centrally with respect to the Lueders' Lines radially traversing the annular intermediate area 26, a fracture of the weakened line 36 can be achieved dependably within a predictable pressure range due to the concentration of bending stresses accompanying pressure-actuated eversion. This concentration of bending stresses is sufficiently great to compensate for variations in material strength and thickness at the weakened line 36 as a result of normal tool wear.

The central circular area 20 is relatively unstressed with a lower order of work hardening as compared to annular areas 26 and 24. Thus, the connecting area 38 has the strength and flexibility to maintain a connected relationship between the tab member 34 and the remainder of the closure element 16 following fracture at the weakened line 36.

The convex configuration of the tab member 34 relative to the concave shape of the remainder of the closure element 16 also is advantageous in that it insures that the material on opposite sides of the weakened line 36 is pulled apart under tension rather than being pressed together at the moment of fracture.

Because of its configuration and location, the tab member 34 is particularly suited to mass production techniques, without unduly increasing costs to the consumer.

Figure 13:
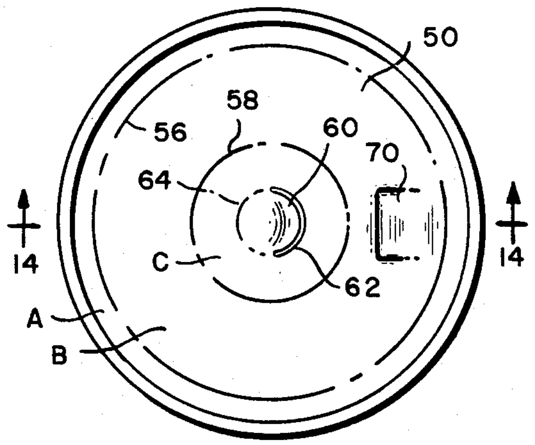
FIG. 13 is a bottom plan view similar to FIG. 2, showing a second embodiment of a pressure relief device in accordance with the present invention.
Figure 14:
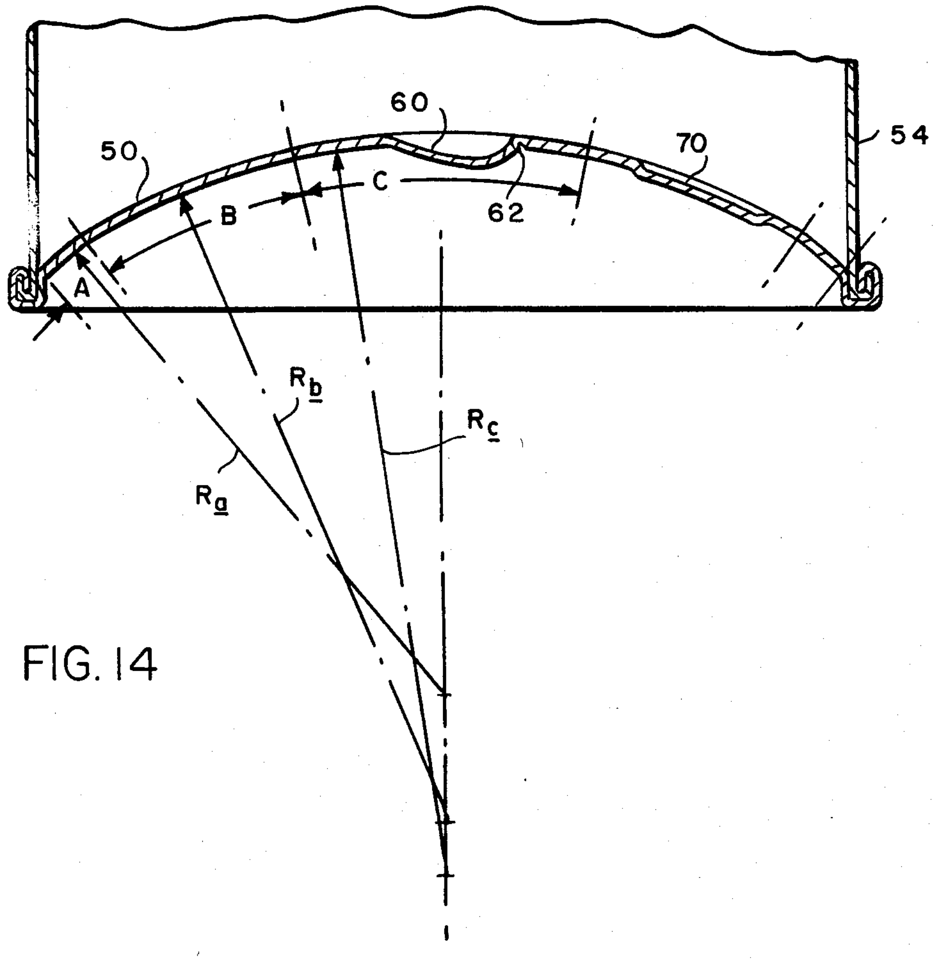
FIG. 14 is a sectional view on an enlarged scale taken along line 14—14 of FIG. 13.
Figure 15:
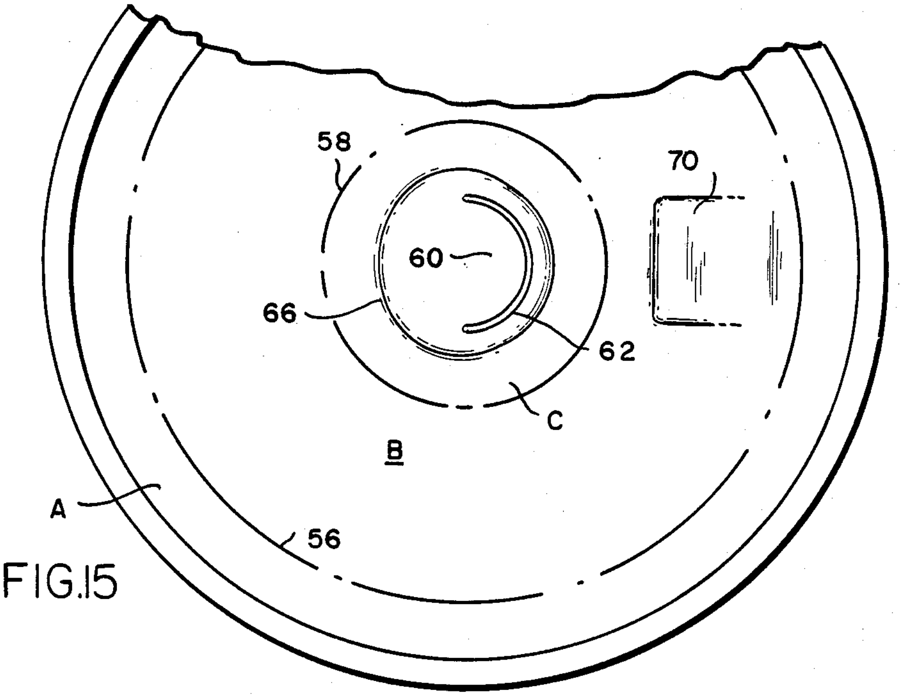
FIGS. 15 and 16 are bottom plan and sectional views respectively of the second embodiment showing the first stage of partial eversion as a result of the container contents being overpressurized.
Figure 16:
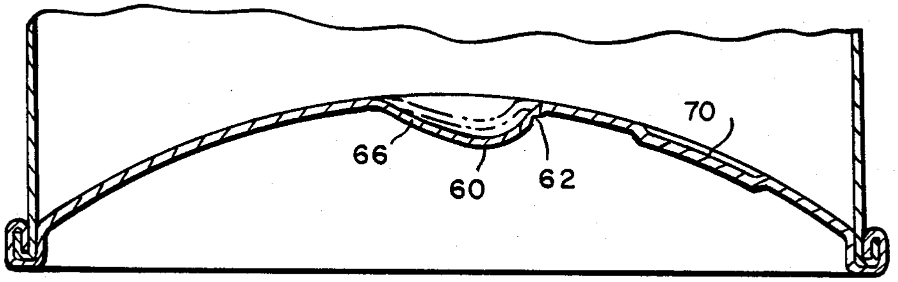
Figure 17:
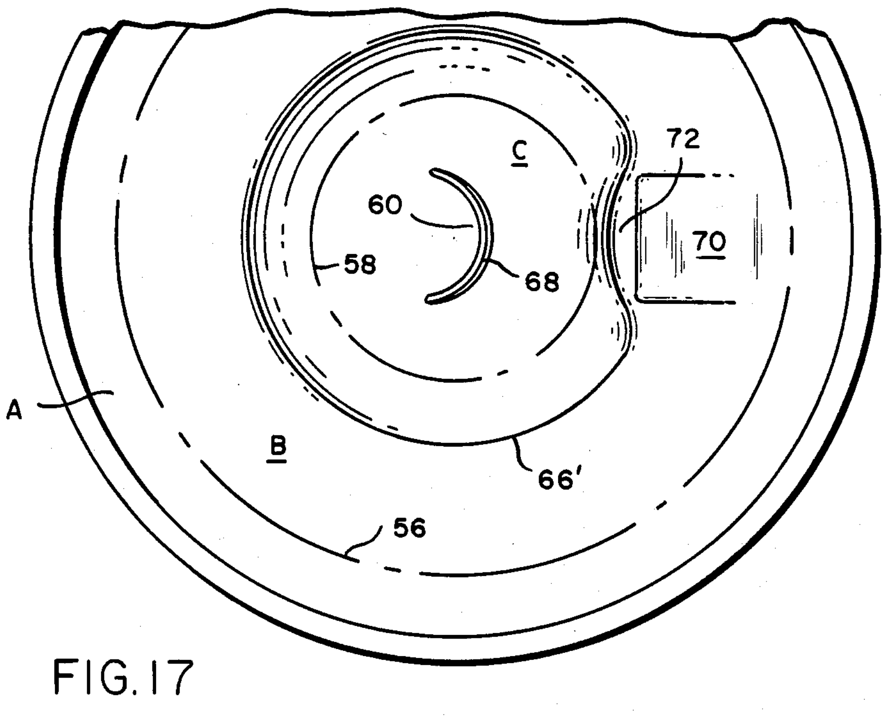
FIGS. 17 and 18 are views similar to FIGS. 15 and 16 showing fracture of the weakened line with accompanying venting of the overpressurized container contents.

A closure element 50 in accordance with a second embodiment of the invention is illustrated in FIGS. 13-18. Closure element 50 is again generally concave in shape and adapted to be peripherally joined by a double seam connection 52 to a cylindrical container side wall 54. The closure element 50 has an annular outer area "A" connected by an annular intermediate area "B" to a central area "C". The areas A, B and C respectively have progressively diminished resistances to eversion caused by overpressurization of the container contents. This is achieved by forming the areas A, B and C with progressively larger radii $R_a$, $R_b$, $R_c$. With this arrangement, eversion as a result of overpressurization of the container contents will be initiated at central area C, rather than at the annular outer area A. In FIGS. 13, 15 and 17, the areas A, B and C have been delineated illustratively by reference lines 56 and 58 and in these views the Lueders' Lines and other normally visible strain lines have been omitted in the interest of clarity.

A convex tab member 60 is formed integrally in central area C. The tab member 60 is partially circumscribed by a weakened line 62 of reduced material thickness lying on a reference circle 64.

Figure 18:
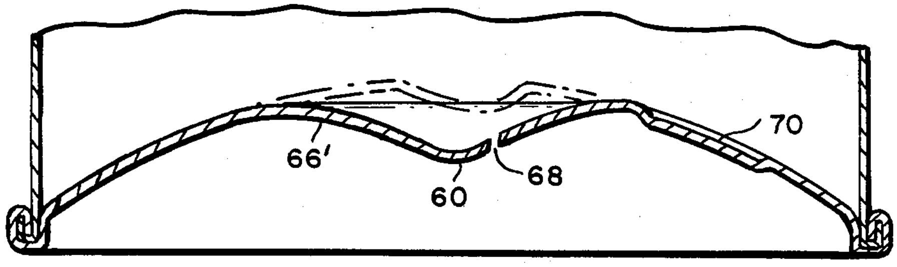

As shown in FIGS. 15 and 16, when the fluid contents of the container undergo overpressurization, the closure element 50 begins to evert as shown at 66. The structural integrity of the closure element is such that initial eversion occurs at central area C and thereafter progresses or expands radially outwardly as shown at 66' into area B as shown in FIGS. 17 and 18. The bending stresses accompanying eversion eventually produce a fracture 68 along weakened line 62, thereby allowing the overpressurized fluid in the container to safely vent therethrough. This halts any further eversion of the closure element and thus safeguards the double seam connection 52 against rupture.

Preferably, the annular intermediate area B is provided with a flattened depression 70 located radially outwardly from the weakened line 62. Depression 70 has an increased resistance to eversion as compared with the remainder of annular area B. Consequently, as shown in FIG. 17, radial outward progress of the eversion is halted or at least significantly resisted as at 72, with the result that the mechanical stresses accompanying eversion are further concentrated at weakened line 62 to hasten the fracture thereof.

The size of fracture 68 and hence the rate at which over-pressurized fluid is vented therethrough can be controlled by varying the circumferential length of the weakened line 62. By way of example, the line 62 can extend between about 45° to 315° around reference circle 64, with a line extending around approximately 180° being preferred for controlled venting.

Test samples of the closure element shown in FIGS. 13–18 have been produced in accordance with the following:

Material: Tin coated cold rolled steel; Type MR #7C Finish; T4CA 135 lb. coating
Gauge: 0.015"
$R_a$: 1,950"
$R_b$: 2,250"
$R_c$: 2.445"

The radial widths of areas A and B were respectively 0.280" and 0.765", the diameter of area C was 0.700", and the diameter of reference circle 64 was 0.470". The weakened lines 62 extended around approximately 180° of the circle 64, with the material along line 62 being coined to a reduced thickness of about 0.002" to 0.0035". The samples were double seamed to the cylindrical walls of cans which then were charged with fluid and overpressurized. The closure elements consistently ruptured along the weakened lines 62 at pressures ranging between 220–235 p.s.i. (a range now approved by the U.S. Department of Transportation) without any resulting damage to the double seam connection. Fluid escaped through the ruptures at a rate which produced little if any propelling action.

I claim:

1. A pressure relief device for a container having a cylindrical side wall, said container being of a type adapted to contain fluid under pressure, said device comprising: an inwardly concave metal closure element circumferentially joined to one end of said side wall, said closure element having a generally outwardly convex tab member integrally formed in a central area thereof, said tab member being partially circumscribed by a weakened line of reduced material thickness, said closure element having a structural integrity which reacts to an overpressurization of the fluid in said container by undergoing eversion which initiates a fracture of the closure element along said weakened line, thereby permitting the over-pressurized fluid contents of said container to escape through said fracture.

2. A pressure relief device for a container having a cylindrical side wall, said container being of a type adapted to contain fluid under pressure, said device comprising: an inwardly protruding generally concave metal closure element circumferentially joined to one end of said side wall, an integrally formed outwardly protruding central area in said closure element, said central area being partially circumscribed by a weakened line of reduced material thickness, said closure element having a structural integrity which reacts to an overpressurization of the fluid in said container by undergoing eversion which intitiates a fracture of the closure element along said weakened line, thereby permitting the over-pressurized fluid contents of said container to escape through said fracture.

3. The pressure relief device of claims 1 or 2 wherein the structural integrity of said closure element is such that said eversion occurs initially at said central area.

4. The pressure relief device of claim 1 or 2 wherein said weakened line occupies between about 45° to 315° of a reference circle located in said central area.

5. The pressure relief device of claims 1 or 2 wherein the structural integrity of said closure element is such that said eversion occurs initially at said central area and thereafter progresses radially across an annular intermedite area of said closure element towards an annular outer area thereof.

6. The pressure relief device of claim 5 further comprising means in said annular intermediate area for resisting the radial progression of eversion thereacross.

7. The pressure relief device of claim 6 wherein said means comprises a flattened depression in said annular intermediate area.

8. The pressure relief device of claim 6 wherein said means is located in said annular intermediate area radially outwardly from said weakened line.

9. The pressure relief device of claim 1 wherein said closure element has an annular outer area connected by an annular intermediate area to said central area, the said outer, intermediate and central areas respectively having progressively diminished resistances to eversion.

10. The pressure relief device of claim 9 wherein said outer, intermediate and central areas are respectively provided with progressively increased radii of curvature.

11. A pressure relief device for an internally pressurized fluid container of the type having a cylindrical side wall, said device comprising:

an inwardly concave closure element circumferentially joined to one end of said side wall, said closure element having an annular outer area connected by an annular intermediate area to a central area, the said outer, intermediate and central areas respectively having progressively diminished resistance to outward eversion caused by overpressurization of the fluid contents of the container; and an outwardly convex tab member in said central area, said tab member being partially circumscribed by a line of reduced material thickness which fractures during eversion of said closure element.

12. A metal container for pressurized fluid, said container comprising:

a generally cylindrical side wall;

an opening at one end of said side wall through which fluid may be charged into said container, said opening being adapted to be closed by a first closure element circumferentially joined to the said one end of said side wall; and an inwardly concave second closure element circumferentially joined to the opposite end of said side wall, said second closure element having an annular outer area connected by an annular intermediate area to a circular central area, the said outer, intermediate and central areas respectively having progressively diminished resistances to outward eversion occasioned by an overpressurization of the fluid contents of the container, said central area having an outwardly convex tab member integrally formed therein, said tab member being partially circumscribed by a line of reduced material thickness which is adapted to fracture during eversion of said second closure element, thereby permitting the pressurized contents of said container to escape through said fracture.

* * * * *